United States Patent [19]

Das et al.

[11] Patent Number: 4,602,363
[45] Date of Patent: Jul. 22, 1986

[54] EXPANSION APPARATUS FOR USE IN COMMUNICATION SYSTEMS

[75] Inventors: Santanu Das, Shelton; Francisco A. Middleton, Sandy Hook; Nicholas J. R. Carter, Shelton, all of Conn.

[73] Assignee: ITT Corporation, New York, N.Y.

[21] Appl. No.: 595,094

[22] Filed: Mar. 30, 1984

[51] Int. Cl.⁴ ............................................. H04Q 11/04
[52] U.S. Cl. .................................... 370/58; 179/18 AD
[58] Field of Search ........................ 370/58, 61, 62, 63, 370/66; 179/18 AD, 18 ES

[56] References Cited

U.S. PATENT DOCUMENTS

| | | | |
|---|---|---|---|
| 4,166,929 | 9/1979 | Sheinbein | 179/18 ES |
| 4,259,549 | 3/1981 | Stehman | 179/18 ES |
| 4,442,321 | 4/1984 | Stehman | 179/18 AD |
| 4,488,004 | 12/1984 | Bogart et al. | 179/18 AD |
| 4,534,023 | 8/1985 | Peck et al. | 370/58 |

*Primary Examiner*—Douglas W. Olms
*Attorney, Agent, or Firm*—Peter Van Der Sluys

[57] ABSTRACT

In order to expand or increase the number of lines of a communications system, this disclosure enables connection of one PBX switching system to another by connecting the switching networks to junctors which establish a multichannel transmission link between the first PBX module and a second module of similar format. The junctor is treated internally in each PBX module as a line or trunk port and whenever an extension number which is not contained in the numbering plan of the individual module is dialed, the control unit of the PBX will direct that call to any free junctor. The complete dialed number is transmitted from the originating module via the junctor to a receiving junctor at the other switching system. The dialed number is received at the receiving junctor through the established communications path between junctors for channel associated signalling or through a common signalling channel through which signalling for all other junctors in the link is transmitted, and after synchronization, it is utilized to made a connection between the called terminal and the calling terminal via the control unit located at the second switching system. The unique use of junctors to connect PBX systems allows for the initial installation of a small system at low cost which system can be expanded in the field in a cost effective manner by merely adding on additional systems. The distance between systems and subscribers in a system has little or no effect on its performance.

16 Claims, 6 Drawing Figures

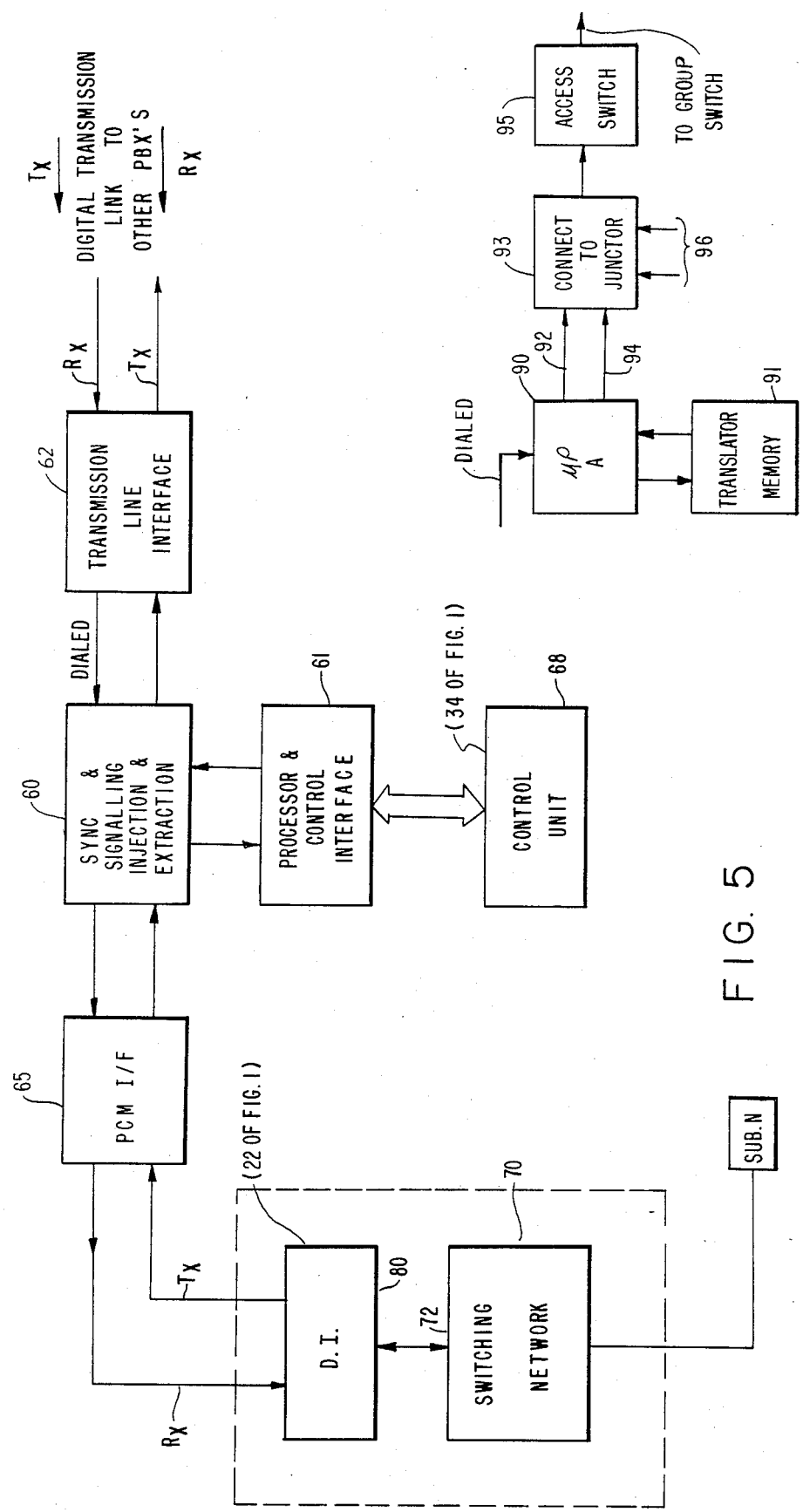

EXPANSION APPARATUS FOR USE IN COMMUNICATION SYSTEMS

BACKGROUND OF THE INVENTION

This invention relates in general to the field of analog and digital voice and digital data communications and particularly to expansion apparatus to enable additional subscribers to be added to an existing communication system in a simple and reliable manner.

A major problem which exists in the design, manufacture and operation of communication systems, especially those systems which are defined in the prior art as PBX Systems, (Private Branch Exchange Systems) or PABX Systems (Private Automatic Branch Exchange Systems) is the expansion of the system as the requirements of the user increase. Many companies who supply such systems provide a family of products in which the cost effectiveness of each of the products is related to the particular size of the initial system which is a function of the number lines.

As one understands, in a communication system such as in a telephone switching system, each subscriber line is associated with a terminal such as a subset and with a line circuit which will allow the terminal to interface with the communications network. In this manner as the number of lines increases, the number of terminals and line circuits increases and hence, the total cost of the system increases.

Apart from this factor is the additional factor that the original central control of the switching system such as the memory translation and other switching functions must be designed to accommodate some maximum number of lines. In many instances this maximum number may not be ascertained, as it becomes a function of the future needs of the subscriber.

Since most, if not all, systems contain some common equipment, both the cost of this equipment and the cost of the number of lines has to be paid for and amortized among the number of lines even at the very low end of the range. For example, if one designed a control and switching network to accommodate 10 lines, the network would still have to have the necessary control to implement connections between each of the 10 lines. Thus this system would have a cost based on the size of the common control as well as the number of lines. In any event, if one built a system having 100 lines, the same common control would still be necessary, but there would be an additional number of lines which would increase the total system cost. Therefore, the 10 line system essentially will have a higher cost per line than the 100 line system. Thus the art recognizes that there is a relatively high cost per line at the low end. Among the same lines, the size complexity and therefore the cost in that portion of common equipment is somewhat proportional and keyed to the expansion capabilities of the system to grow to larger sizes whereby more subscriber lines are included.

Essentially, from the above consideration, it is easily inferred that the cost effectiveness and the ability of a system to grow from very small line size (e.g. 5 to 10 lines) to the larger end of the spectrum (e.g. 10,000 lines), while maintaining cost effectiveness throughout the range is an almost incompatible requirement. The prior art implemented many approaches in an attempt to solve the growth and the cost effectiveness requirements in such provided switching systems. The most common approach has been to specify the size range and to design switching systems tailored to each one of those line sizes. For example, many manufacturers of PBX and PABX devices provide a small, a medium and a large system, and each user will purchase one of the three systems according to the number of terminals needed. This is a typical approach used by many manufacturers.

A refinement of this approach has been an attempt to keep the same basic technology and/or building blocks to maintain a family concept throughout the products covering the various ranges. Essentially, this implies that the manufacturer will provide a switching network and a common control which uses identical modules, and the modules are added to obtain small to larger switching networks. This solution has been adequate to accommodate switching networks using very few lines as well as switching networks of medium size which is between 200 to 300 lines. In any event, even the most advanced technological concepts for switching systems have evidenced a need for drastic changes within the system to allow one to make a transition from a medium size network to a large size network. Thus, in attempts to expand the system from 300 to 10,000 or more lines, one experiences the need for fundamental changes which in turn manifests itself in extremely high cost per line in implementing such a transition. A common limitation of the approaches outlined above is the fact that once a system has been installed in the field, then growth capabilities are limited by the upward bound range for which the individual product has been designed. Accordingly, when a given user has reached the saturation end of the product in use, and in order to satisfy the growth needs, the current system has to be discarded and a new investment is required which indicates increased expense to enable the user to purchase a new system for the larger range.

It is, therefore, an object of the present invention to provide an improved switching system which will enable expansion from a low order system to a high order system in a simple and efficient manner. Another object of the present invention is to provide apparatus which will enable a small switching system to accommodate an increased number of lines by the use of special junctor interfaces which will provide for a rapid and immediate expansion from a low number of lines to a higher number of lines.

BRIEF DESCRIPTION OF THE FIGURES

FIG. 5 is a simplified block diagram of a junctor apparatus according to this invention.

FIG. 6 is a simple block diagram depicting apparatus for converting a calling line to a junctor.

DETAILED DESCRIPTION OF THE INVENTION

The particular technique to be described relating to expansion of a switching system has particular applicability to the Private Automatic Branch Exchange (PABX) depicted in co-pending application entitled COMBINING AND SPLITTING OF VOICE AND DATA FROM MULTIPLE TERMINAL SOURCES, Ser. No. 445,626, filed on Nov. 30, 1982 by N. Carter et al and assigned to the assignee herein. Said application is incorporated herein by reference.

Figure 1:
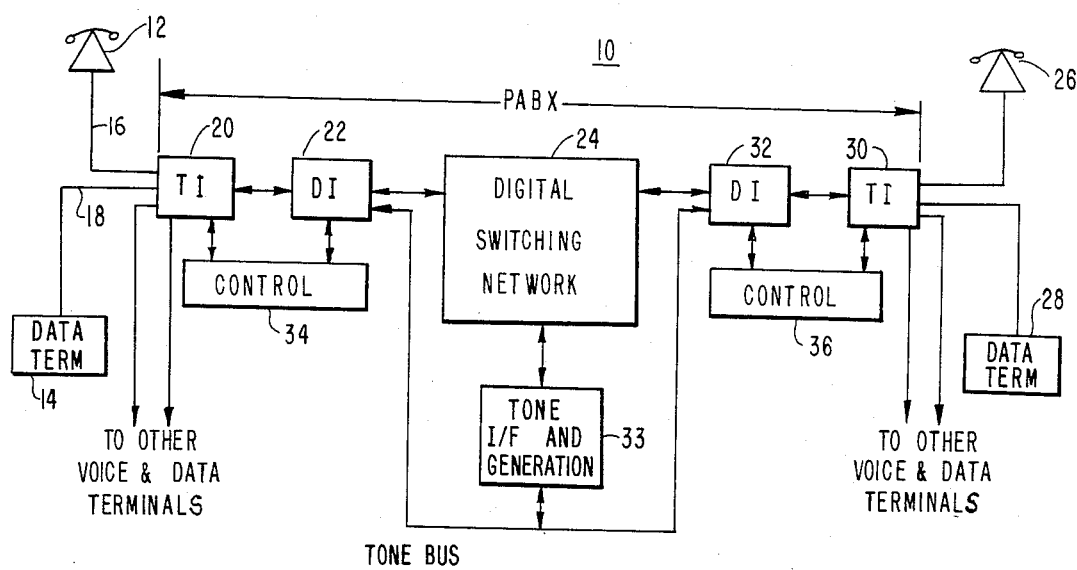
FIG. 1 is a generalized block diagram illustrative of a PABX incorporating provision for simultaneous full duplex transmission of voice and data according to a switching system format described in detail in a copending patent application entitled COMBINING AND SPLITTING OF VOICE AND DATA FROM MULTIPLE TERMINAL SOURCES, filed on Nov. 30, 1982 for N. Carter et al as Ser. No. 445,626.

Referring to FIG. 1, there is shown a simple block diagram of a PABX system of the type described in the above noted patent application which system incorporates provision for the simultaneous full duplex transmission of voice and data to two-port system users. The system depicted in FIG. 1 is, of course, a general schematic diagram of the system in which this expansion technique is particularly applicable.

The above noted co-pending application contains a full description of system operation, but in order to clarify the present application, a brief description of FIG. 1 is believed to be warranted.

Referring to FIG. 1, the simultaneous transmission of voice and data in a two port communication system is illustrated. Voice and data are coupled to a Private Automatic Branch Exchange (PABX) 10 from a plurality of voice and data terminals, one of which voice terminals is shown as telephone subscriber set 12 and one of which data terminals is shown as data terminal 14. Telephone subscriber set 12 and data terminal 14 are coupled via two-wire lines 16 and 18 to a transmission interface circuit 20 in a PABX 10, which is adapted to receive both analog and digital information.

Telephone subset 12 may comprise a telephone keyset, with keyset signal being coupled over the two-wire pairs 16 and 18 in accordance with a phantom multiplexing technique described in co-pending U.S. patent application, Ser. No. 433,335, filed Oct. 17, 1982, of F. Middleton which is assigned to the assignee herein.

The transmission interface 20 may be comprised of a telephone line circuit, including a CODEC and BORSCHT circuits of known design, such as are described, for example, in U.S. Pat. Nos. 4,163,633 of R. Treiber; 4,317,963 of R. Chea; 4,270,027 of B. P. Agrawal et al and 4,272,648 of B. P. Agrawal et al, all of which are representative of various telephone line circuits for interfacing analog and/or digital transmission inputs to a digital line. All of the above noted patents are assigned to the assignee herein and include various details which are applicable to the general construction techniques to be described.

In the system of FIG. 1, digital data from terminal 14 on line 18 is comprised of 8 bit data words encoded in standard HDB-3 code as is conventional. The data is arranged to obtain positive and negative pulses and also to enable the recovery of the system clock signal. A conventional RS-232 modem for a computer terminal interface may be alternately used for this purpose being utilized in each end of line 18.

Designated voice and digital data are coupled to the digital interface circuit 22 to provide a full duplex communication link between digital interface 22 and a digital switching network 24, with half duplex links provided between transmission interface 20 and data terminal 14 and subscriber set 12. Alternately, full duplex transmission may be provided in a known manner to PABX 10 by well known ping pong or echo cancelling techniques or by four wire lines. The digital switching network 24 preferably is a distributed control switching network. The details of such a network are described in U.S. Pat. No. 4,201,889 entitled DISTRIBUTED CONTROL DIGITAL SWITCHING SYSTEM by A. J. Lawrence et al, issued on May 6, 1980 and assigned to the assignee herein.

The digital switching network 24 couples frames of channels of digitally encoded data and digitized speech from any desired subscriber or data terminal to any other desired subscriber or data terminal.

FIG. 1 shows the interconnection of subscriber 12 and data terminal 14 to subscriber 26 and data terminal 28 via the switching network 24. The terminal interface 30 and digital interface 32 function in the identical manner as terminal interface 20 and digital interface 22. Control circuitry 34 and 36 also contain processing capabilities to handle protocols between the digital interface 22 and 32 respectively to subscriber sets and data terminals.

Control circuit 34, for example, may comprise an Intel 8086 microprocessor for use in detection of off-hook signaling and applying ringing tones such as are described in U.S. Pat. No. 4,349,703 of R. Chea also assigned to the assignee herein.

The particular system includes a tone bus which operates in conjunction with a tone interface and generation circuit 33 which enables common data to be transmitted to a plurality of subscribers connected to the system via the tone bus. These techniques are fully described in the above noted co-pending application. Essentially, the digital interface, as explained in the co-pending application, enables one to employ a data partitioning technique wherein the PCM speech transmission data field is utilized to contain both digitized speech and other data in the same channel within a frame where each frame has 32 channels of information. The system, therefore, allows speech and data to be contained in a common information field and to be simultaneously transmitted in the same channel, frame by frame, through the digital switching network to other system users.

Essentially, the PABX 10 as previously described in FIG. 1 is well adapted to suit the most modern communication needs of a user as it has the ability to transmit both speech and data to various terminals.

Figure 2:
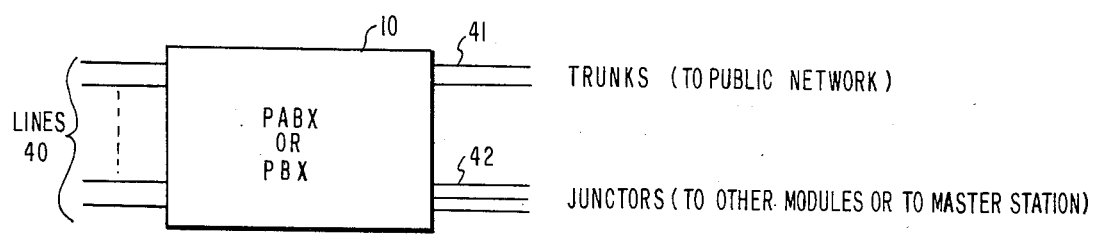
FIG. 2 is a simplified block diagram of a PABX system utilizing junctor ports for system expansion.

Referring to FIG. 2, there is shown a block diagram of the entire system which will be utilized to explain the operation of this invention in greater detail.

In FIG. 2, the PABX 10 which is shown in greater detail in FIG. 1 essentially is a self-contained module which has subscriber lines 40 serviced by the PABX and to which connections between the various lines can be made according to the format and protocol indicated in the above noted co-pending application. As in all such systems, the PABX can access a public switching network such as the conventional telephone system via trunk lines as 41 to enable any subscriber line to communicate with other subscriber lines outside the particular system. In this invention, there are also a plurality of junctors, lines 42, which, as will be explained, are utilized to connect the PABX module 10 to other identical modules to thereby enable expansion of the system from a system of a given number of lines 40 to systems including multiples as N times the number of lines 40.

As indicated in the Background of the Invention, in order to overcome limitations in growth and the economic impact of the traditional solutions to the expansion problem, this invention utilizes the above noted switching system and enables expansion from a small number of lines by allowing the switching system to interconnect with other units of similar characteristics via the junctors, as will be described.

In this way when a small switching system is required at a given location such as PABX 10, the module can be delivered and equipped to satisfy a given number of lines, therefore, making the system completely cost effective at that size. As the need for more lines increases, additional circuit boards to handle lines and trunks can be added to the system up to its maximum capacity, and therefore, the user only has to absorb the additional cost as his needs grow. This is the traditional manner of expanding a system to its maximum capacity. When the ultimate size capacity of module 10 has been reached or is approaching its end, a second module is added to the network in order to double the capacity of the network. This also solves space and cabling problems especially if the need arises from building expansion.

For example, perhaps only two or maybe up to four additional modules as PABX 10 will be required to satisfy the needs for a given location. As will be explained, the additional or added modules are interlinked by junctors which are designed to be an inherent part of the system architecture. These junctors will allow high traffic interconnectivity between each of the modules, therefore, being able to grow smoothly and with minimum cost impact on a per line basis. Thus when initial or subsequent size needs go beyond the line size capacity limitation of the small PABX, the overall system can be expanded using a common module as PABX 10 whose structure is identical to that of the other systems. By doing this, the traffic limitations of directly interconnecting modules as PABX 10 to one another is overcome, since each one of the links of the individual modules can be used to its maximum capacity and properly routed to the destination module as required.

According to this invention, as will be described, each one of the modules, together with the interconnecting one, is totally independent of the others; therefore, its control units and software do not need to absorb any equipment or data base as do prior art systems.

It is clear that by doing this, the system can grow smoothly by just adding modules and/or ports to the common switching system as the growth needs may call for. Thus the new and old systems do not have to absorb any common equipment or program formats to make provisions for the expansion needs.

Thus according to the technique to be explained, the system allows a wide range of line sizes with the system having the ability to grow and increase the number of lines in field use. There is virtually no cost impact at the low line size end of the range which is normally the most cost sensitive area, while there is a minimum cost impact for larger line sizes.

Figure 3:
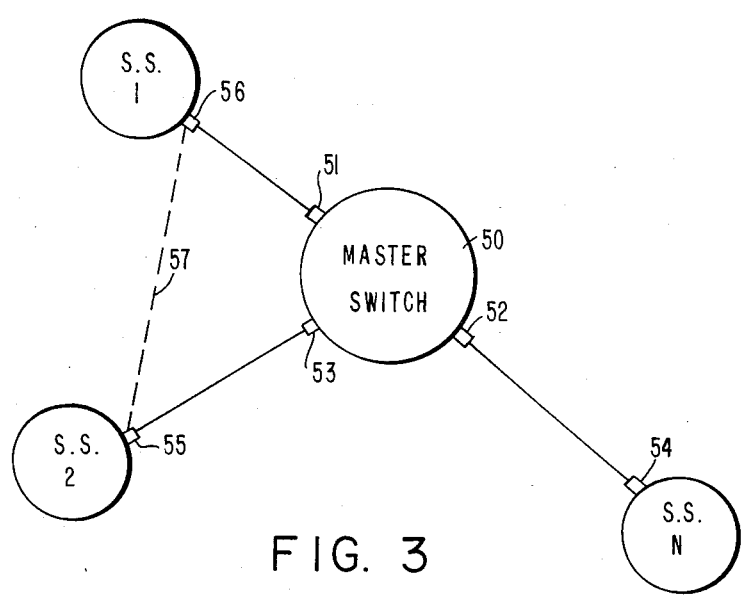
FIG. 3 is a simple block diagram explaining the expansion capabilities of using a module PABX system.

Referring to FIG. 3, there is shown a master switch 50. The master switch 50 may, for example, be a PABX such as module 10 which is supplied with a plurality of junctors as 51 to 53. Each junctor as shown is connected to satellite switches (SS) as SS 1 to SS N. The satellite switches each contain suitable junctors as 54, 55 and 56.

In the operation to be described, master switch 50 which is a PABX module is connected to other PABX modules as SS 1 to SS N. In the system operation to be described, the master switch 50 will receive at its incoming junctor 52 the call received and determine in which of the satellite switches the terminating call is intended for, and will repeat the procedure establishing a path between the incoming junctor and the available junctor to the proper satellite switch. In the system to be described, the number which is the called number is transmitted to the junctor which in turn transmits it to the terminating junctor of a satellite switch and the call is completed in this manner.

As shown in FIG. 3, the master switch comprising a portion of the network can be unlimitedly expanded without having to alter the data bases of the satellite switches which are connected to the master switch 50 via the junctors. In the dialing analysis process at each PABX, whenever it is determined that the dialed number does not correspond to the individual numbering plan of that switch, the entire dialing information is transmitted to the master switch 50 which is the only entity which contains the overall data base of the network. Internally to each of the terminating switches as SS 1 to SS N, all calls are treated as line-to-line calls with no special signalling scheme that represents an expansion or overhead to the individual control units.

For applications where the size of the network is such that it can be handled with only two individual switches such as SS 1 and SS 2 without the need of a master switch, the same procedure applies and there is no need for a data base or common knowledge anywhere in any of the switches to allow for the modules to communicate. In a two-switch system junctors 56 and 55 of switches SS 1 and SS 2 may be converted directly via a line 57. In such a case terminals in SS 1 can communicate with terminals of SS 2 without knowing that the terminals associated with SS 2 are not located at SS 1 and vice versa. Thus the junctor appears to the switch into which it is plugged as a subscriber line. Whenever a non-existent line number is dialed, the call is routed by the switch to a junctor which in turn passes it to the next switch along with the dialing information. Thus the system to be described allows for expandability without having to incur a large cost when employing a small configuration.

Since the call handling program for a module can be written such that in the event a nonexisting individually called number is dialed, the call will be routed to an available junctor. In this manner the program can also check for the availability of a junctor in the system, and when one is not available, the system will supply a busy signal back to the calling line to indicate a busy condition. Thus the junctors as 54, 55 and 56 are equipped as required by the growth needs of the system, and therfore, the system cost at each level can be kept within reason as for the low end. This enables no additional cost absorption at the low end line level and relatively minimum costs as the system expands.

Figure 4:
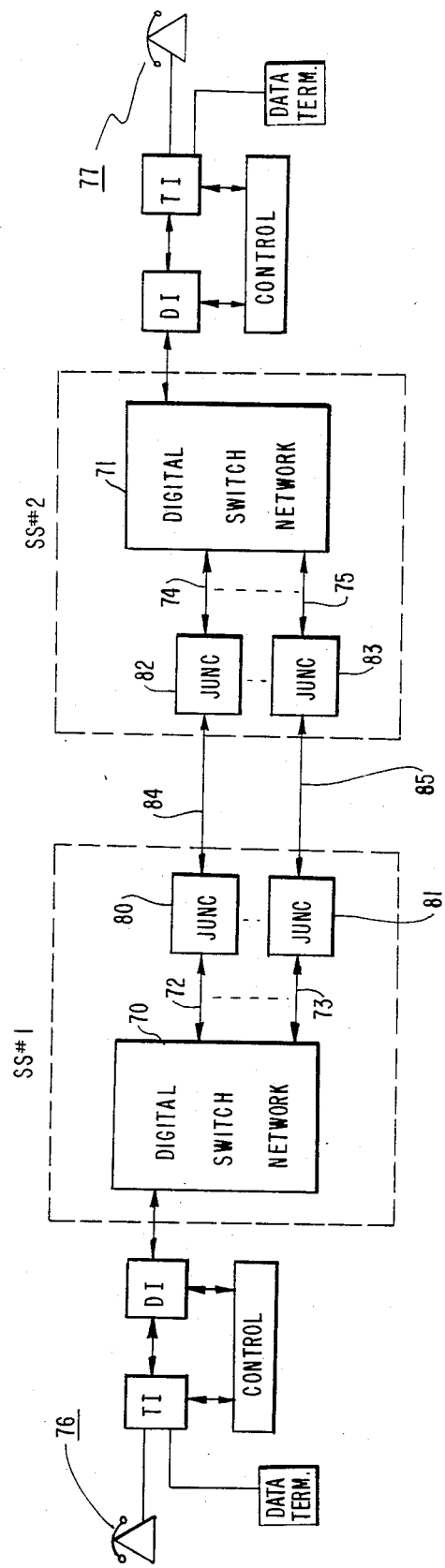
FIG. 4 is a block diagram depicting a connection from a first PABX switching system to a second PABX switching system according to this invention.

Referring to FIG. 4, there is shown a connection between a first switching system designated as SS 1 and a second satellite switching system designated as SS 2. It is noted that each switching system comprises a PABX module such as that shown in FIG. 2 as module 10. In accordance with the present invention, digital switching networks as 70 and 71 are associated with SS 1 and SS 2 respectively, each having a plurality of output ports as 72 and 73 for SS 1 and 74 and 75 for SS 2. It is noted that although only two ports are shown in the diagram, each switching network may be associated with more than two ports and, therefore, more than two junctor terminals. Each switching system has a plurality of subscribers such as 76 for SS 1 and 77 for SS 2. The subscribers are those subscribers as shown in FIG. 1 as 12 and 26. The following operation occurs in utilizing expansion techniques according to this invention.

The switching system SS 1 may be implemented at a location and, for example, may be designed to accommodate 100 lines. When a requirement is made for additional lines, a second switch system such as SS 2 is brought to the location and SS 2 as SS 1 would accommodate an additional 100 lines. The two systems would be connected together via the respective junctor terminals as 80 and 81 for SS 1 and 82 and 83 for SS 2. The junctors are connected via bidirectional transmission links 84 and 85. The numbering plan, that is the subscriber telephone numbers for SS 2 are different from those for SS 1. The control units of the switching network as well as those units of the switching system are programmed such that if a number is dialed which is not within the numbering plan in the associated switch, the switching system automatically makes a connection to a junctor port as ports 72 and 73 for SS 1 and ports 74 and 75 for SS 2.

The junctor, as will be explained, are essentially similar to the digital interfaces as 22 and 32 of FIG. 1. The one function of the junctor is to transmit and to receive a dialed number to enable the associated switching network such as networks 70 and 71 to make a connection to or from the junctor port to a subscriber line associated with that switchboard. This, therefore, allows a connection between any subscriber as subscriber 76 of SS 1 to any subscriber in SS 2 such as subscriber 77. The junctors also allow bidirectional transmission between subscribers. The operation is accommodated as follows.

Assume subscriber 76 which is associated with switching system SS 1 desires to place a call to subscriber 77 associated with switching system SS 2. The following sequence of events occurs. Subscriber 76 goes off-hook and receives a dial tone under control of SS 1. He then proceeds to dial the number assigned to subscriber 77 who is associated with SS 2. The control circuitry associated with the switch recognizes that the dialed number is not a number assigned to any subscriber in SS 1. Therefore, the control circuitry makes a connection through the digital switching network 70 to junctor port 72 and thus connects subscriber 76 to junctor 80. The control unit associated with the switch transmits the dialed number to junctor 80 which in turn forwards the number to junctor 82 associated with switching system SS 2. Junctor 82 receives that dialed number and via its control recognizes that it is the number assigned to subscriber 77. Junctor 82 causes the digital switching network 71 to connect port 74 to the port associated with subscriber 77. Hence there is now a connection for both voice and data between subscribers 76 and 77 which occurs via the junctors 80 and 82. Essentially, each junctor appears as a subscriber to the respective digital switching network it is connected to as networks 70 and 71.

As indicated, the exact operating procedures as well as the transfer of voice and data are completely described in the above noted co-pending patent application. This patent application also contains the necessary structure and logic in order to implement connections within each individual switching system such as SS 1 and SS 2.

Referring to FIG. 5, there is shown a simplified block diagram of the junctor circuitry depicted in FIG. 4 as junctor circuitry 80 to 83. As shown in FIG. 5, the switching system such as 70 of FIG. 4 has an output port 72 coupled to a junctor 80. The junctor 80 includes a digital interface such as interface 22 of FIG. 1 which, as explained in the co-pending application in FIG. 6 thereof, can separate analog and digital data as well as providing synchronization and so on for the switching network. The receive and transmit lines designated as $R_x$ and $T_x$ of the digital interface are coupled to a PCM interface 65. This interface contains a transmit and receive buffer amplifier as well as an isolation transformer to respond to the receive and transmit data.

The outputs of the PCM IF 65 which are also a receive and transmit line are coupled to a sync and signalling injection and extraction circuit 60. Essentially, this circuit receives the PCM signals and alters the signal for synchronization as well as performing sync separation and processing. The modules 60 and 65 depicted in FIG. 5 are analogous to modules 300, 310, 320 and 308 as shown in the co-pending application in FIG. 6. The purpose of the module 60 is to synchronize the data received from the PCM IF 65. The data is then separated so that the dialed number which has been transmitted from switching network 70 now enters the processor and control interface 61 associated with module 60. This processor and control interface 61 performs the same function as the local control logic 329 and blocks 322, 328 and 330 of FIG. 6 as shown in the co-pending application. The processor control interface 61 is coupled to a control processor 68 which is similar to the processor 34 of FIG. 1. The control unit then retransmits the entire number which it stores via the processor to the control interface and the sync and signal module 60.

It is understood there may appear to be duplication of function between the blocks 60, 61, 65 and blocks within the digital interface 80. This does not affect the overall operation and the functional blocks are shown separately as 60, 61, 65 for clarity. In practice the total circuitry may be reduced for economy. However, as shown in FIG. 5, the junctor is a completely independent unit, connected as a subscriber termination.

The dialed number as transmitted by the control unit is now emplaced upon the transmit line of the transmission line interface 62. The transmission line interface 62 operates similarly to the PCM IF 65 and hence transmits the dialed number on the transmit line. At the other location, the transmit line $T_x$ of the transmission line interface 62 is connected to the $R_x$ line or receive line of the associated transmission line interface. The dialed number then is impressed upon the receive lead of the sync and signalling inject circuit 60 of the remote switch where it is now transmitted via the processor and control interface 61 to the control unit 68 all located at the remote switch. The control unit 68 at the remote switch immediately recognizes that this dialed number is a valid number for the remote switch. Hence the control unit 68 as described in the co-pending application will now access the switching network via the digital interface as if it were a subscriber to cause a connection to be made from the junctor port to the proper line. It is, of course, understood that all components indicated are clearly described in the co-pending application in regard to function and operation.

Essentially, from the above description, each junctor is connected as an actual subscriber terminal as far as the local switching system is concerned, and hence when a dialed number is not recognized by a control unit as being as assigned number, the switching system will connect the calling terminal to a junctor and this number will be transmitted to a remote junctor which also appears as a subscriber line. Signalling between switching nodes (PBX's) can be done by channel associated signalling mechanisms for single junctor low traffic applications or by means of a common channel signalling (e.g. CCITT#7) for multiple junctor or high speed communications. The remote junctor stores the transmitted number in memory, requests service from the associated switching network which thereby connects the junctor to the proper line. Thus making a full connection between the calling and called lines.

Thus as one can ascertain, expansion of a module PABX is simply afforded by the use of such junctor circuits. The system described above is particularly applicable to the switching system depicted in the above noted co-pending application.

It should be noted that the physical distance between any satellite or between a satellite and a master switch is arbitrary and is not limited to any particular distance.

In particular the digital switching networks are distributed control switching networks whose operation is explained in U.S. Pat. No. 4,201,889, issued on May 6, 1980 to A. J. Lawrence et al entitled DISTRIBUTED CONTROL DIGITAL SWITCHING SYSTEM.

As one can ascertain from that patent, the switching system contains a terminal subunit which is shown in the patent in FIG. 1. Each terminal subunit contains two groups of processors. The first group of processors is dedicated to service a separate group of terminals or ports called the terminal cluster and perform specific groups of processing functions such as path setup through the group switch.

The operation of the entire switching system is explained in great detail in U.S. Pat. No. 4,201,889. In any event, referring to FIG. 6, a brief description of how the above expansion techniques operate will be given. The entire number which emanates from a subscriber such as subscriber 12 of FIG. 1 is transferred to the A processor 90 which is analogous to A processor shown in the above noted patent. This processor as indicated contains a memory which is a translator and which has stored therein all the calling numbers or the equipment numbers for each terminal connected to the switch. Alternatively the processor can communicate with an auxillary processor which contains these stored numbers in order to verify if the called number is connectable within the switch. The microprocessor 90 stores the dialed number and scans the translator 91 to determine whether or not there is a match of this number to determine that the called line is within the switch. If there is not a match, and it is a valid number, the microprocessor transfers the dialed number via line 92 to module 93 which is a connect-to-junctor circuit. The signal indicating that a match has not been found is applied to line 94. The connect-to-junctor circuit may be a shift register or a further microprocessor and operates to make a connection to the line which originated the dialed number to a free junctor by interfacing with the access switch 95. The access switch 95, as can be seen from the above noted patent, interfaces with the group switch and to the digital switching network, and hence a connection is now made between the calling line and the junctor.

The connect-to-junctor 93 also has inputs 96 from the other junctors in the switching system indicating whether they are idle or busy. There are, of course, many ways of implementing the above noted technique, but reference is particularly made to the above noted patent so that one can understand how the digital switching network 24 of FIG. 1 operates as it is explained in great detail in the above noted patent.

Once a connection is made to the junctor circuit via the access switch and group switch, the output of the junctor circuit is also connected to the input of a junctor circuit located at the remote switchboard. This junctor receives the dialed number from the transmitting junctor circuit, and as indicated, each junctor appears as a terminal subscriber to the switching system. The remote junctor requests service and a connection is now made by the remote junctor and the terminal at the other switch which is indicated by the calling number. Thus the connection now made between the two lines utilizing the respective junctor circuits to implement and enable bidirectional transmission.

Another advantageous feature that may be used with the present invention is that common channel signalling may be used between satellite systems. Here, the link between junctors is assumed to comprise a multiple data/voice channel capability as in the PCM links of the switch referenced, one of these channels can carry signalling information between junctors in a known manner for the remainder of the voice or data channels in the link. Thus each junctor will appear as a group of subscribers to each switch.

I claim:

1. Apparatus for connecting a first PBX communications switching system to a second PBX communications switching system to enable an increase in subscriber line capacity, each of said systems being associated with a separate switching network and each of said switching networks having ports for coupling to subscriber terminals, each of said ports in each of said networks being represented by a unique code number, with the code numbers in said first system different from the code numbers in said second system so that any port in said first system can be connected to any other port by dialing the code number of said other port and where any port in said second system can be connected to any other port by dialing the code number of said other port, comprising:

first junctor means including a processor and having an input connected to a port of said first switching system and an output for bidirectional transmission, second junctor means including a processor and having an input connected to a port of said second switching system and an output for bidirectional transmission, means for coupling the output of said first junctor means to the ouput of said second junctor means to enable bidirectional transmission between said ports and therefore between said first and second switching system, processing means located at said first and second switching systems and operative to provide an output when any code number is dialed from a port in one of said systems which is not indicative of another port within the same system, and means responsive to said output for connecting said dialing port to said junctor port associated with the switching system of the dialing port to cause said dialed code number to be transmitted via said connection to said other junctor means, said other junctor means passing the dialed code number to its associated switching system for establishing a connection to the port corresponding to the dialed code number, whereby a transparent connection is made from the dialing port to the dialed port without the need for any special signalling to make the connection from the first to the second switching system which system may be separated by a considerable distance without effecting performance.

2. The apparatus according to claim 1 wherein each junctor means includes a memory associated with said processor and operative to store said dialed code number in said memory.

3. The apparatus according to claim 1 wherein said input of said first junctor means is connected to an output port of said first switching system.

4. The apparatus according to claim 1 wherein said input of said second junctor means is connected to an output port of said second switching system.

5. The apparatus according to claim 1 wherein said first and second switching systems are data and speech communications switching systems capable of simultaneously transmitting data and speech.

6. The apparatus according to claim 1 wherein the switching systems are of a similar format.

7. The apparatus according to claim 1 additionally comprising subscriber terminals coupled to selected ones of said ports.

8. The apparatus according to claim 1 additionally comprising a plurality of junctors connected to a plurality of ports.

9. A method for connecting a first PBX switching system having a plurality of ports to a second PBX switching system having a plurality of ports in order to increase the overall line capacity of a switching system, comprising the steps of:
   assigning a first series of code numbers to the ports of said first system and a different series of code numbers to the ports of said second system, wherein each code number is indicative of each port of said respective switching system;
   connecting said first and second switching systems together via a first port of said first PBX system and a first port of said second PBX system by placing junctor circuits at said first ports, said junctor circuits each having a memory for storing therein a code number, and connecting said junctor circuits together to enable bidirectional communication between said first ports;
   monitoring all code numbers generated by calling ports in each system to determine whether said numbers are associated with ports within the same system, and
   connecting a calling port in said first system to said first port of said first system for any code number generated in said first system not associated with a port therein, whereby said junctor circuit of said first system stores said code number and transmits said code number to the junctor circuit of said second system for connection to a port in said second system having said code number.

10. A method according to claim 9 wherein said first and second systems are data and speech switching systems capable of simultaneously transmitting data and speech.

11. The method according to claim 9, wherein said first and second ports are output ports of said switching systems.

12. The method according to claim 9, wherein signalling between switching systems interconnected by junctors is accomplished by means of a common channel devoted to communicating bidirectional signalling information for all other junctors existing in that communications link.

13. Apparatus for increasing the subscriber line capacity of first PBX switching system by adding to said system a second PBX switching system, each of said systems including a multi-port digital switching network, said first system having a given number of first ports, with each of said first ports having a separate and distinct code number, with said second system having a given number of second ports with each of said second ports having different and distinct code numbers from any of said first ports with said first and second ports capable of calling another port in each of said systems by dialing said code number associated with said another port, said apparatus enabling any first port to call any second port, comprising:
   at least one first junctor means coupled to a port of said first digital switching network, said junctor means including a processing means having a memory for storing a code number;
   at least one second junctor means coupled to a port of said second digital network, said junctor means including a processing means having a memory for storing a code number, with said first and second junctor means coupled together to provide a bidirectional transmission path from said first to said second switching network; and
   control means associated with each of said first and second switching networks and operative to detect a code number dialed by a port in said network to determine whether said number is a valid code number for that switching network and to provide an output signal when said dialed number is not a valid code number for that switching network and means responsive to said output signal to connect said dialing port to said junctor means of that switching network, said junctor means storing said dialed number and transmitting said number as stored to said other junctor means associated with said other switching network, whereby said other switching network is responsive to said dialed number to connect said dialing port at said connected switching network to said dialed port at said other switching network.

14. The apparatus according to claim 13 further including a first plurality of junctor means coupled to different ports of said first digital network and a second plurality of junctor means coupled to different ports of said second digital network, with each of said junctor means in said first plurality coupled to an associated one of said junctor means in said second plurality to enable multiple calls to be made to said second system.

15. The apparatus according to claim 13 wherein said junctor comprises multiple channel capability, enabling multiple calls to be made between said networks on one physical line.

16. The apparatus according to claim 13 wherein said first and second switching systems are data and speech switching systems capable of simultaneously transmitting data and speech.

* * * * *